United States Patent [19]

Nash

[11] Patent Number: 5,505,286
[45] Date of Patent: Apr. 9, 1996

[54] FRICTION CLUTCH

[75] Inventor: Ian Anthony Nash, Woodloes Park, United Kingdom

[73] Assignee: Automotive Products, plc, Leamington Spa, England

[21] Appl. No.: 211,231
[22] PCT Filed: Aug. 28, 1992
[86] PCT No.: PCT/GB92/01575
  § 371 Date: Mar. 25, 1994
  § 102(e) Date: Mar. 25, 1994
[87] PCT Pub. No.: WO93/07400
  PCT Pub. Date: Apr. 15, 1993

[30] Foreign Application Priority Data

Oct. 4, 1991 [GB] United Kingdom ............. 91 21 155.7

[51] Int. Cl.$^6$ ............................. F16D 13/70; F16D 13/52
[52] U.S. Cl. ................. 192/52.1; 192/70.27; 192/110 R
[58] Field of Search ........................... 192/109 A, 109 B, 192/70.21, 70.27, 89.23, 52, 110 R

[56] References Cited

U.S. PATENT DOCUMENTS

| | | | |
|---|---|---|---|
| 1,444,361 | 2/1923 | Badois | 192/52 |
| 1,632,526 | 6/1927 | Willgoos | 192/109 BX |
| 2,171,829 | 9/1939 | Haupt | 192/70.27 X |
| 2,251,367 | 8/1941 | Miller | 192/70.27 X |
| 2,333,037 | 10/1943 | Osborn | 192/109 B |
| 2,341,747 | 2/1944 | Vincent | 192/109 B |
| 2,639,013 | 5/1953 | Meschia | 192/109 BX |
| 2,964,930 | 12/1960 | Aira et al. | 192/106.1 X |
| 3,739,896 | 6/1973 | Shono | 192/89.23 X |
| 4,009,771 | 3/1977 | Crankshaw | 192/109 BX |
| 4,693,352 | 9/1987 | Lang et al. | 192/70.27 |
| 5,123,510 | 6/1992 | Beccaris et al. | 192/109 BX |

FOREIGN PATENT DOCUMENTS

| | | | |
|---|---|---|---|
| 591944 | 7/1925 | France | 192/109 B |
| 2546591 | 11/1984 | France | 192/109 B |
| 2150653 | 8/1988 | United Kingdom . | |

Primary Examiner—Rodney H. Bonck
Attorney, Agent, or Firm—Paul E. Milliken; Lee A. Germain

[57] ABSTRACT

A motor vehicle friction clutch having a flywheel, an annular plate attached coaxially to the flywheel and rotatable with the flywheel and which is biased away from the flywheel by a first spring; a clutch cover assembly secured to the flywheel and comprising a cover, a pressure plate and diaphragm spring, and a clutch driven plate sandwiched between the pressure plate and the annular plate.

9 Claims, 3 Drawing Sheets

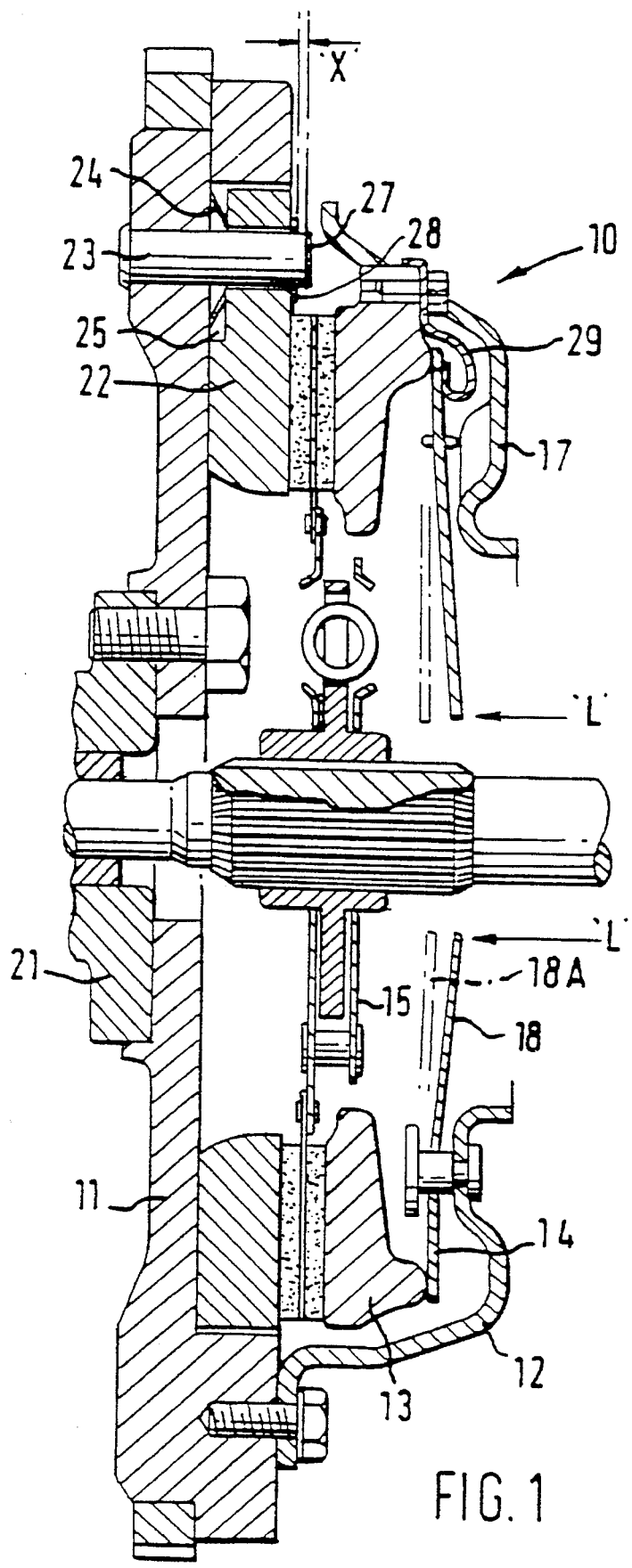
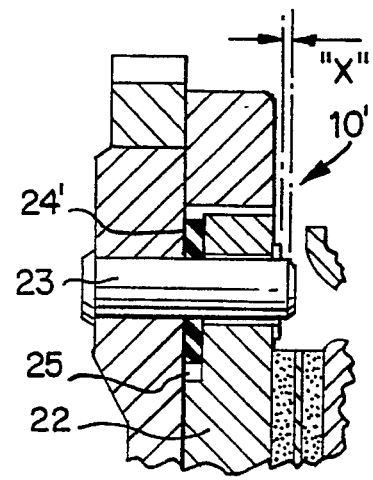
FIG. 1A
FIG. 1

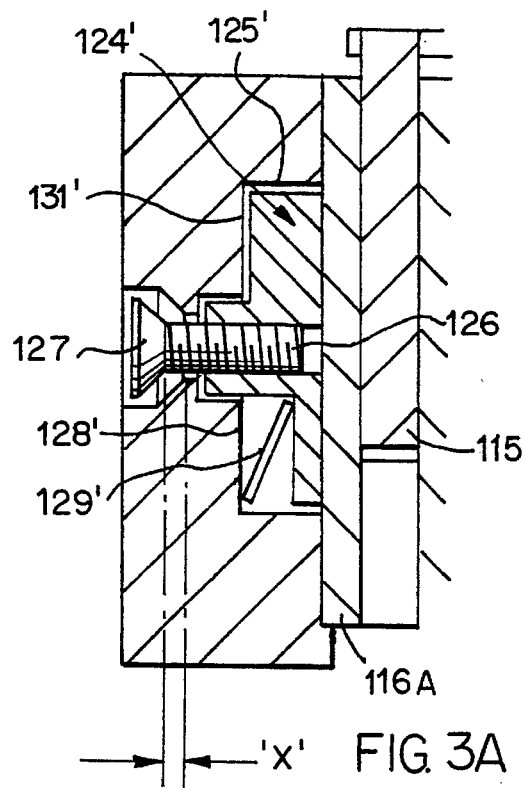
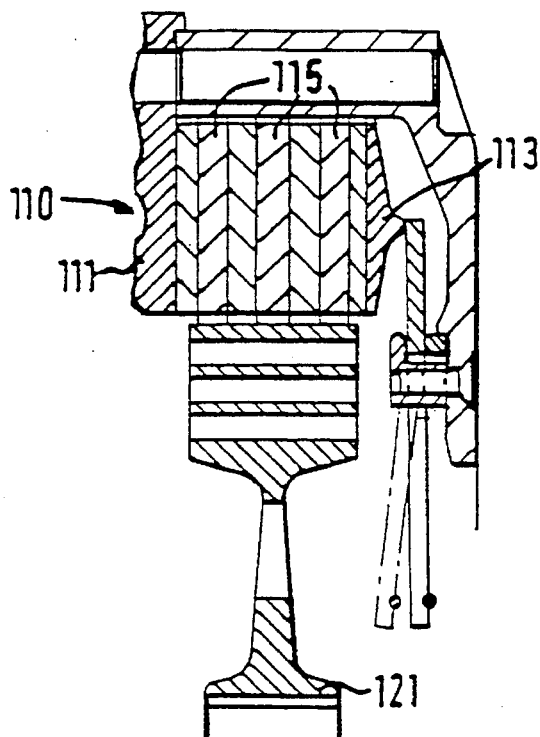
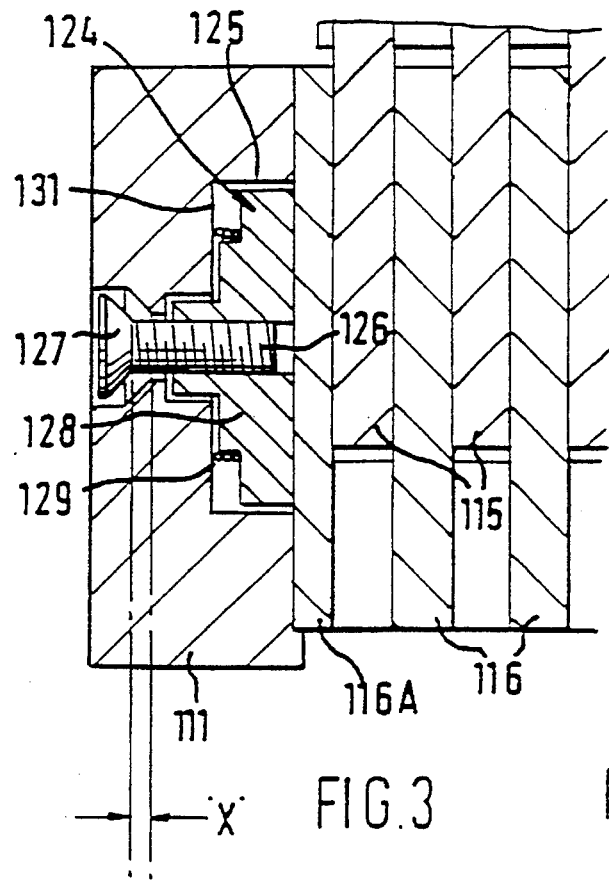
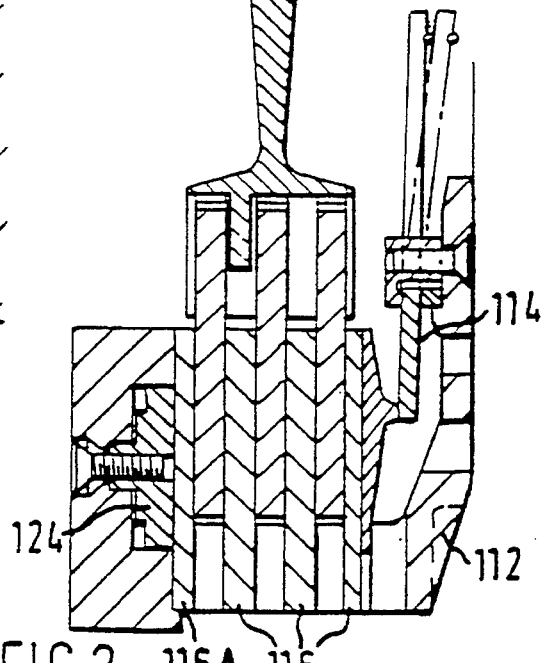
FIG. 3A
FIG. 3
FIG. 2

FRICTION CLUTCH

This invention relates to friction clutches and in particular to motor vehicle friction clutches, particularly for use in cars, more preferably racing cars.

The type of friction clutches used in racing cars are such that the clutch pedal travel between a clutch release position and a clutch engaged position is very small. This in effect means that the clutch engagement is very sudden and sharp.

The present invention seeks to smooth the take-up of such friction clutches.

According to the invention there is provided a friction clutch for a motor vehicle and which comprises a flywheel which is attachable to an engine crankshaft, an annular plate coaxial with and rotationably fast with the flywheel and which is biased away from the flywheel by a first spring means acting between the flywheel and said plate, a clutch covey secured to and axially fixed relative to the flywheel, a pressure plate and second spring means acting between the cover and the pressure plate to urge the pressure plate towards the flywheel, and at least one driven plate sandwiched between tile pressure plate and the annular plate, said first spring means allowing a variation in the axial position of said annular plate relative to the cover to provide cushioning of clutch engagement and disengagement.

Preferably the maximum axial spacing between the flywheel and the annuler plate is adjustable. Preferably the annular plate is a second flywheel mass coaxial with the said flywheel mass. Alternatively when the clutch is a multi plate clutch comprising a plurality of driven plates, each located between axially separable drive plate, the annular plate is provided by one of the drive plates.

The invention will be described by way of example and with reference to the following drawings in which:

FIG. 1 is section through a first friction clutch assembly according to the invention;

FIG. 1A is a partial view similar to FIG. 1 showing an embodiment with an elastomeric material acting as the spring means.

FIG. 2 is a section through a second type of clutch assembly according to the invention;

FIG. 3 is an enlargement of a detail from FIG. 2;

FIG. 3A is a partial view similar to FIG. 3 showing an embodiment with a belleville spring which is coaxial with the flywheel;

Figure 5:
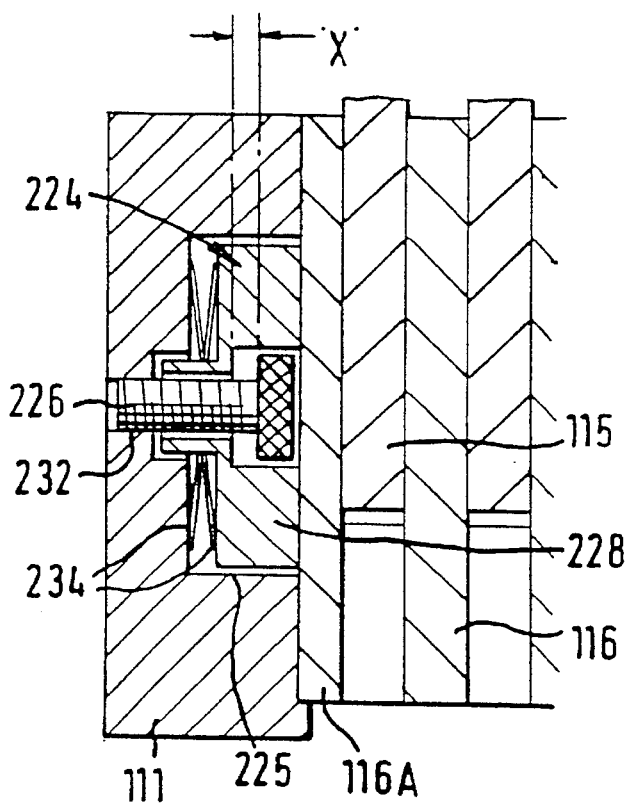
FIG. 5 is an enlargement of a detail from FIG. 4.

With reference to FIG. 1 there is illustrated a motor vehicle friction clutch 10 which includes a flywheel 11 fixed to the crankshaft 21 of an internal combustion engine. The flywheel 11 is held rotationally fast with coaxial annular plate 22 by pins 23. The annular plate 22 is in the form of a second flywheel mass which is axially separable from the flywheel 11. The cover assembly 12 comprises a clutch cover 17, a pressure plate 13, and diaphragm spring 14 secured to the cover 17 to bias the pressure plate towards the flywheel. The pressure plate is engageable with the friction facings on a driven plate 15 which is sandwiched between the pressure plate 13 and the annular plate 22.

The diaphragm spring is a frustoconical spring comprising a radially outer annular portion having a plurality of radially inwardly extending spaced fingers 18 thereon. The spring 14 is coned away from the flywheel 11.

The flywheel 11 and annular plate 22 are secured rotationally fast by a plurality of the pins 23 circumferentially spaced around the flywheel. Preferably there are three such pins but a greater number of pins may be necessary. The annular plate 22 is biased axially away from the flywheel by spring means 24 acting between the flywheel and the annular plate. The term 'spring means' includes elastomeric materials acting as springs. The spring means in this case comprises a plurality of spring elements 24 in the form of belleville springs, located one around each pin 23 and accommodated in a recess 25 in the faces of the annular plate adjacent the flywheel 11.

The total maximum spring load of the belleville springs 24 is less than the load exerted by the diaphragm spring 14, but is varied to suit the requirements of the vehicle. This enables the adjustment of clamp loads versus release travel characteristic for required comfort of torque transfer.

The annular plate 22 is guided for axial movement by the pins 23 and the end of the pins 23 away from the flywheel 11 has an abutment 27 thereon to limit the axial movement of the annular plate. A spring washer 28 may be located around each pin between the annular plate 22 and the abutment 27. When a clutch release bearing (not shown) applies a clutch release travel 'L' to the radially inner ends of the fingers 18 of the diaphragm spring 14 the clamp load exerted on the pressure plate 13 decreases. The radially outer margin of the to diaphragm spring 14 is attached to the pressure plate 13 by clips 29 so that the diaphragm spring can positively lift the pressure plate away from the driven plate 15 as the radially inner ends of the spring move axially inwardly to the position 18a shown in dotted outline.

As the pressure plate 13 moves away from the flywheel 11, the bias of the spring elements 24 keeps the clutch plate sandwiched between the annular plate and the pressure plate 13 so that the clamping load on the driven plate is slowly reduced until the annular plate has moved axially a distance 'X' against the abutment 27, and thereafter the pressure plate moves axially away from the driven plate and the rate at which the clamp load is removed increases.

When the clutch is engaged the reverse sequence of events takes place. The pressure plate 13 comes into contact with the driven plate 15 which is clamped against the annular plate 22 with the initial clamping load being cushioned by the spring elements 24.

As the clamping load is increased the annular plate moves towards the flywheel 11 against an increasing resistance from the spring elements 24, until the annular plate 22 abuts the flywheel 11.

Figure 6:
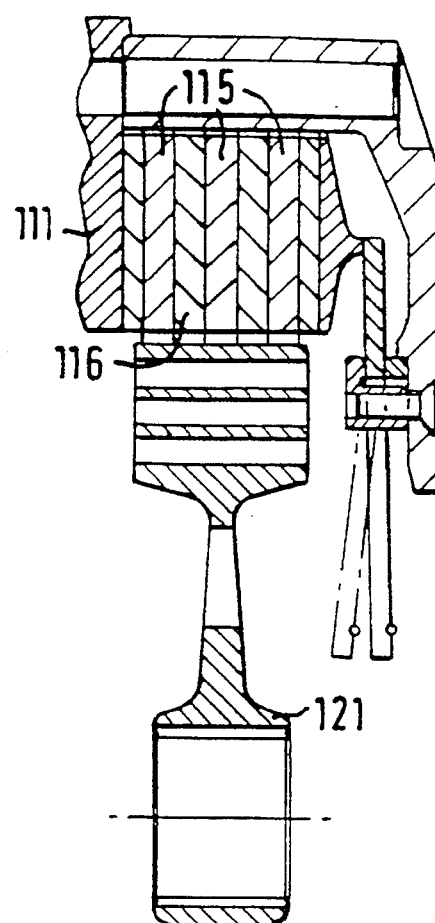
FIG. 6 is a graph of release load versus release bearing travel, and pressure plate lift for prior art clutches and clutches according to the present invention.
Figure 6:
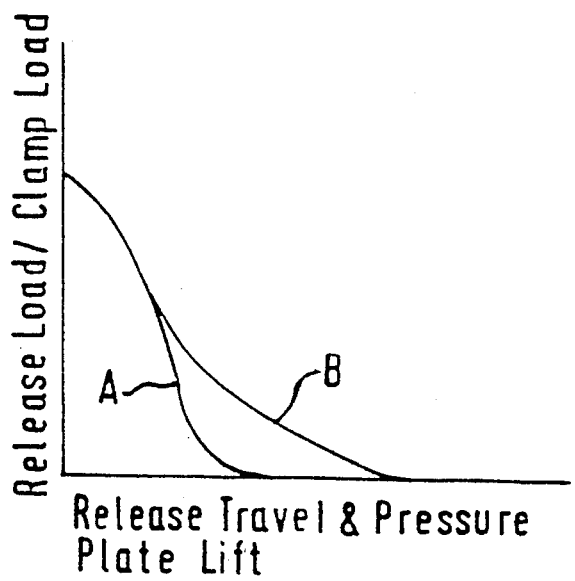

The sequence of events is illustrated in FIG. 6 which is a graph of clamp load (i.e. the load on the driven plate) versus release travel and pressure plate lift. Release travel is the distance moved by the release bearing during operation of the clutch. The curve A represents clamp load versus release travel for a typical racing non cushioned clutch in which the driven plate is sandwiched against a solid flywheel. The curve B represents clamp load versus release travel for a clutch according to the present invention. It will soon be seen that as the release bearing travel is reduced i.e. during clutch engagement, the clamp load is applied to the driven plate more gradually in the case of 'B' than 'A'. With reference to FIG. 1A there is illustrated a motor vehicle friction clutch 10' similar to friction clutch 10 except that each belleville spring 24 has been replaced with elastomeric material 24' which acts as a spring.

Now with reference to FIG. 2 and FIG. 3, there is illustrated a second embodiment of the invention in which the friction clutch is multiplate clutch 110 of the type used in racing cars or motorcycles. The clutch 110 includes a flywheel 111, and a clutch cover assembly 112 which is bolted to the flywheel 111. A plurality of driven plates 115 having inner radial teeth that engage a central hub 121 are sandwiched between drive plates 116 that have outer radial teeth that engage the clutch cover assembly 112, so that the driven plates 115 and drive plates 116 are all axially movable relative to the flywheel 111 and cover assembly 112 includes a diaphragm spring 114 that biases a pressure plate 113 against the stack of drive and driven plates to clamp them against the flywheel 111.

The driven plate 116A adjacent the flywheel 111 constitutes said annular plate and is biased away from the flywheel by a plurality of spring elements 124 circumferentially spaced around the flywheel. There are preferably between three and six spring elements 124 (but could be more) each of which is located in a recess in the form of a stepped axial bore 125 in the face of the flywheel adjacent the annular plate 116A.

Each spring element 124 comprises a screw 126 having a head 127 which is located in a countersunk hole in the surface of the flywheel away from the annular plate 116A. The screw 126 has a threaded connection with a spring end cap 128. A helical spring 129 is located in the stepped bore 125 and acts between a shoulder 131 therein and the spring end cap 128 to bias the end cap against the annular plate 116A. The axial movement 'X' of the end cap 128 toward the cover assembly 112 is limited by abutment of the screw head 127 against the countersunk hole and hence the axial expansion of the first spring means is limited by the spring end cap means. This distance 'X' is adjustable as required by altering the effective distance between the screw head 127 and the end cap 128.

Figure 4:
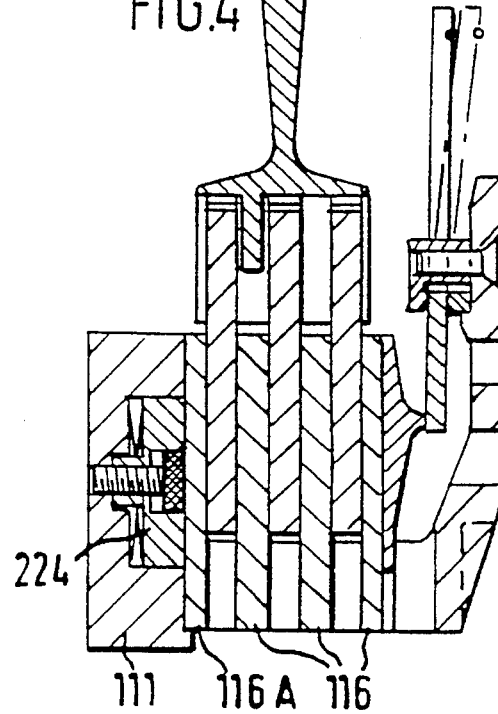
FIG. 4 is a alternative version of the clutch of FIG. 2.

The friction clutch illustrated in FIG. 4 and 5 is substantially identical to that shown in FIG. 2 and 3 excepting for the spring elements 224. The spring elements 224 are again housed in a recess 225 in the flywheel 111. However the recess 225 is blind bore having a coaxial screw threaded hole 232 in the base thereof. A screw 226 cooperates with the threaded hole 232 to form a variable length strut to limit the axial movement of a spring end cap 228 away from the flywheel under the bias of two back to back belleville washers 234 located by the end cap 228.

With reference to FIG. 3A there is illustrated a multiplate friction clutch 110 similar to the multiplate friction clutch 110 except that the plurality of spring elements 124 have been replaced with a single spring element 124' which is concentric with the flywheel.

Also the spring element 124' is located in an annular stepped recess 125' in the face of, and concentric with the flywheel adjacent the annular plate 116A.

The spring element 124' comprises a plurality of screws 126, a belleville spring 129' and an annular end cap 128'. Each screw has a head 127 which is located in a countersunk hole in the surface of the flywheel away from the annular plate 116A and has a threaded connection with the annular end cap 128' which end cap is concentric with the flywheel. The belleville spring is located in the annular stepped recess 125' and is concentric with the flywheel and acts between a shoulder 131' therein and the spring end cap 128' to bias the end cap against the annular plate 116A.

It will be appreciated that the above examples are only selected means of performing the invention. Other examples could be a single belleville coaxial and substantially coextensive within the flywheel and the annular plate. Furthermore the helical spring of FIG. 2 could be used in conjunction with the screw and end cap of FIG. 3, and the belleville washers of FIG. 4 could be used in FIG. 2 etc.

All these combinations will operate as previously described with reference to FIG. 6.

I claim:

1. A friction clutch for a motor vehicle which comprises a flywheel which is attachable to an engine crankshaft, an annular plate coaxial with and rotationably fast with the flywheel which is biased away from the flywheel by a first spring means acting through spring end cap means, the first spring means provides a cushion load between the flywheel and said annular plate, a clutch cover secured to and axially fixed relative to the flywheel, a pressure plate, a second spring means acting between the cover and the pressure plate to provide a clamp load to urge the pressure plate towards the flywheel, at least one driven plate sandwiched between the pressure plate and the annular plate said first spring means allowing a variation in the axial position of said annular plate relative to the cover to provide cushioning of clutch engagement and disengagement, the maximum axial expansion of the first spring means being limited by the spring end cap means to allow replacement of the annular plate without affecting the cushion load setup.

2. A friction clutch as defined in claim 1 in which the first spring means comprises elastomeric material.

3. A friction clutch as claimed in claim 1 wherein the maximum axial spacing between the flywheel and said spring end cap means is adjustable.

4. A friction clutch as claimed in claim 3 wherein the maximum axial spacing between the flywheel and said spring end cap means is adjustable by screw thread means.

5. A friction clutch as claimed in claim 1 wherein the first spring means comprises a plurality of spring elements circumferentially spaced around the flywheel.

6. A friction clutch as claimed in claim 5 wherein the spring elements are each housed in a recess in the axially directed face of the flywheel to act against the adjacent axially directed face of the spring end cap means.

7. A friction clutch as claimed in claim 5 wherein the spring element is a helical compression spring.

8. A friction clutch as claimed in claim 5 wherein the spring element comprises at least one belleville washer.

9. A friction clutch as claimed in claim 1, wherein the first spring means is a single belleville spring coaxial with the fly wheel and said annular plate.

\* \* \* \* \*